(12) United States Patent
Bohnenberger

(10) Patent No.: US 8,991,891 B2
(45) Date of Patent: Mar. 31, 2015

(54) DEVICE FOR COVERING A STORAGE COMPARTMENT AND STORAGE COMPARTMENT DEVICE

(71) Applicant: Faurecia Innenraum Systeme GmbH, Hagenbach (DE)

(72) Inventor: Thorsten Bohnenberger, Scheibenhard (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/057,881

(22) Filed: Oct. 18, 2013

(65) Prior Publication Data
US 2014/0110962 A1    Apr. 24, 2014

(30) Foreign Application Priority Data
Oct. 18, 2012    (DE) .......................... 10 2012 020 479

(51) Int. Cl.
B60N 3/12    (2006.01)
B60R 7/06    (2006.01)
B60N 3/00    (2006.01)

(52) U.S. Cl.
CPC .. B60R 7/06 (2013.01); B60N 3/002 (2013.01)
USPC ..................................................... 296/37.12

(58) Field of Classification Search
CPC .......... F25D 2317/0665; F25D 23/003; F25D 2400/06; F25D 2317/067; F25D 2400/04; F25D 17/065; B41F 27/1206; B60J 7/028; B60H 3/06; B60H 3/0641
USPC ......................... 296/37.12, 107.08, 37.1, 37.8
See application file for complete search history.

(56) References Cited

U.S. PATENT DOCUMENTS

| 2,789,861 | A |   | 4/1957  | Hudson |
| 3,062,606 | A | * | 11/1962 | Magrauth ................. 312/34.24 |
| 4,733,900 | A | * | 3/1988  | Fluharty .................... 296/37.8 |
| 4,930,737 | A | * | 6/1990  | McNeill .................... 296/37.12 |
| 5,332,305 | A | * | 7/1994  | Slivon et al. ................ 312/328 |
| 5,397,160 | A | * | 3/1995  | Landry ...................... 296/37.8 |
| 5,845,965 | A | * | 12/1998 | Heath et al. ............. 297/188.19 |
| 5,971,463 | A | * | 10/1999 | Nowak et al. .............. 296/37.8 |
| 6,003,927 | A | * | 12/1999 | Korber et al. .............. 296/37.8 |
| 6,045,173 | A | * | 4/2000  | Tiesler et al. .............. 296/37.8 |

(Continued)

FOREIGN PATENT DOCUMENTS

| DE | 4327869 C     | 8/1994  |
| DE | 102004053322 B | 12/2005 |

(Continued)

OTHER PUBLICATIONS

European Search Report for corresponding application No. EP 13 00 5006, dated Nov. 27, 2013, 6 pages.

*Primary Examiner* — Kiran B Patel
(74) *Attorney, Agent, or Firm* — Reising Ethington P.C.

(57) ABSTRACT

The invention relates to a device for covering a storage compartment (10), in particular a glove compartment in the interior of a motor vehicle, with a cover plate (22), the inner surface (30) of which in opened state forms a storage surface. The device is characterized in that the cover plate (22) is able to be moved from its closed position by means of at least one guide (40, 42) for the formation of the storage surface into a horizontal storage position or into a stowage position, wherein the storage compartment (10) is at least partly opened in the storage position and in the stowage position.

11 Claims, 12 Drawing Sheets

(56) References Cited

U.S. PATENT DOCUMENTS

| | | | |
|---|---|---|---|
| 6,131,242 A * | 10/2000 | Zipperle et al. | 16/82 |
| 6,669,258 B1 * | 12/2003 | Kato | 296/1.01 |
| 6,719,343 B2 * | 4/2004 | Emerling et al. | 296/24.34 |
| 6,783,166 B2 * | 8/2004 | Kato | 296/37.12 |
| 7,125,063 B2 * | 10/2006 | Kawamoto et al. | 296/37.8 |
| 7,163,248 B2 * | 1/2007 | Adams et al. | 296/24.34 |
| 7,455,016 B2 * | 11/2008 | Perin | 108/44 |
| 7,494,172 B2 * | 2/2009 | Herterich et al. | 296/37.8 |
| 7,500,704 B2 * | 3/2009 | Herrera et al. | 296/37.12 |
| 7,685,901 B2 * | 3/2010 | Leopold et al. | 74/434 |
| 7,931,322 B2 * | 4/2011 | O'Brien et al. | 296/24.34 |
| 8,002,323 B2 * | 8/2011 | Jones et al. | 296/37.1 |
| 8,074,832 B2 * | 12/2011 | Fujiwara et al. | 220/811 |
| 8,556,320 B2 * | 10/2013 | Yamagishi et al. | 296/24.34 |
| 8,727,413 B2 * | 5/2014 | Seiller et al. | 296/24.34 |
| 2003/0218373 A1 * | 11/2003 | Etzioni et al. | 297/411.3 |

FOREIGN PATENT DOCUMENTS

| | | |
|---|---|---|
| EP | 2213510 A1 | 8/2010 |
| FR | 2896207 A1 | 7/2007 |
| FR | 2904798 A1 | 2/2008 |
| FR | 2949722 A | 3/2011 |
| WO | WO2010044612 A | 4/2010 |

* cited by examiner

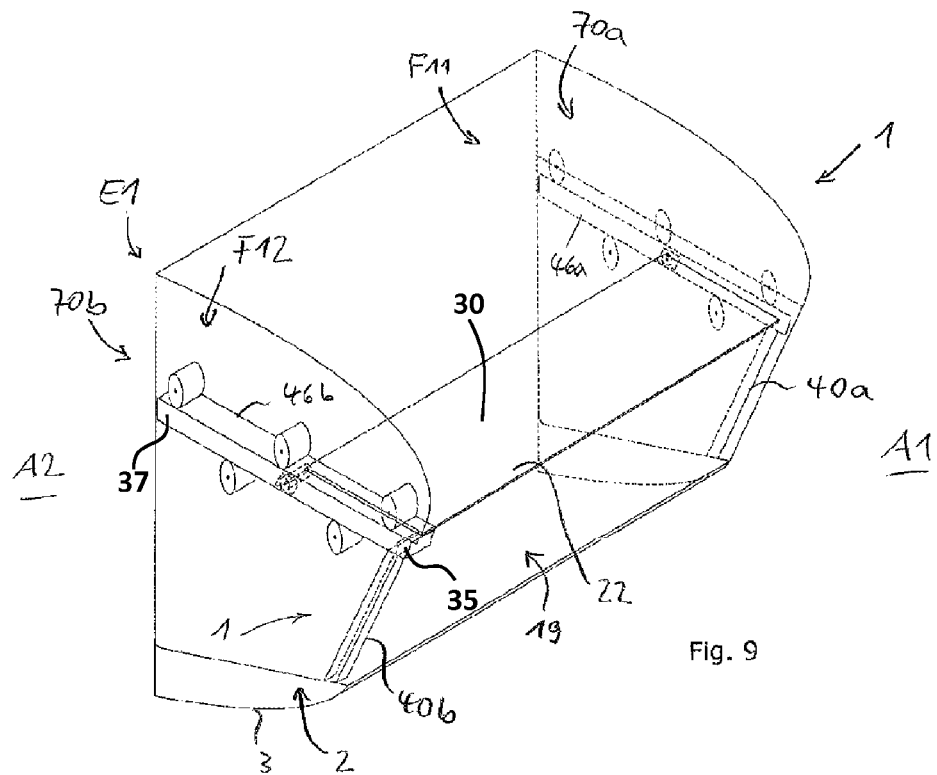
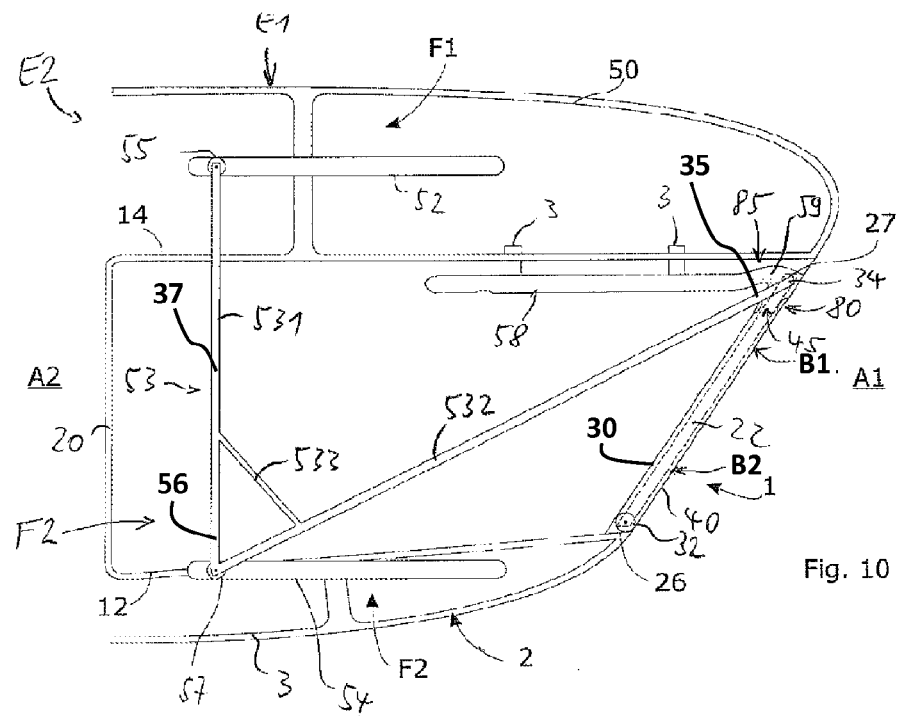

DEVICE FOR COVERING A STORAGE COMPARTMENT AND STORAGE COMPARTMENT DEVICE

TECHNICAL FIELD

The invention relates to a device for covering a storage compartment, which can be in particular a glove compartment in the interior of a motor vehicle, and a storage compartment device.

BACKGROUND

DE 10 2004 053 322 B3 discloses a compartment cover with a storage drawer which is held in a guided manner in a guide formed in the compartment cover, and with a translatory lever linkage which is able to be supported in a fixed manner outside the cover and is embodied such that on opening of the compartment cover the storage drawer is moved simultaneously relative to the compartment cover.

From U.S. Pat. No. 2,789,861 A a device is known in which the cover is able to be opened up by means of a simple hinge axis to expose the storage compartment, and in so doing forms with its inner side an additional storage surface.

From DE 43 27 869 C1 a device is known, arranged in the region of the instrument panel at the height of the front passenger seat of a commercial vehicle, in which a tray-shaped working table is able to be opened up from a storage compartment which is normally covered.

From WO 2010/044612 A2 a shelf is known, which is arranged above a storage compartment closable by means of a cover, and which is able to be pulled out independently from the opening of the storage compartment.

From FR 2 949 722 A a shelf is known which is pivotably mounted on the outer side of a cover of a storage compartment.

SUMMARY

The present disclosure may address the problem of indicating a device for covering a storage compartment, and a storage compartment device, in which respectively a covering of a storage surface is provided and which has an adjustment kinematic arrangement which is able to be adapted to the installation conditions of the respective storage compartment.

This problem may be solved by the features of the independent claims. Further embodiments are indicated in the subclaims.

In general, the problem may be solved by a device for covering a storage compartment with a cover, the inner side of which in the opened state forms a storage surface, wherein the cover is able to be moved from its closed position by means of at least one cover plate guide to form the storage surface into a substantially horizontal or into a horizontal storage position or into a stowage position, wherein the storage compartment in the storage position and in the stowage position is at least partially open.

The device can have at least one guide part coupled to the cover plate, which guide part is displaceably guided in at least a first guide device of the cover plate guide arranged on the storage compartment with a guideway into which the guide member is received, wherein the cover plate is coupled to a guide part which is displaceably guided with a first end piece in at least a second guide device of the cover plate guide arranged on the storage compartment, and with a second end piece, which is situated opposed to the first end piece, is articulated on an upper region or section of the cover plate.

The device for covering a storage compartment is understood herein to mean a cover plate adjustment device, which has a cover in particular in the form of a cover plate. The storage compartment, on which the cover plate adjustment device is arranged, can be in particular a glove compartment which is mounted or integrated on a supporting structure in the interior of a motor vehicle. The storage compartment is embodied in particular as a safekeeping container or a housing which has an opening region for moving objects through, in order to deposit them in the safekeeping container or the housing. This opening region in an intended installation in a supporting structure is left free by the latter.

Owing to this opening region and owing to the cover or the cover plate which in its closed state completely or partially covers this opening region, a longitudinal direction is defined as reference direction, i.e. a reference longitudinal direction, and a vertical plane as reference plane, i.e. a reference vertical plane. The reference longitudinal direction can be defined here in particular such that it projects perpendicularly on the inner face of the cover or of the cover plate, when the latter is situated in its closed state, in the surface middle point thereof, from the latter. A storage compartment longitudinal direction can also be generally defined, which extends from a storage compartment opening, formed on the front side of the storage compartment, to a rear wall thereof. The reference vertical plane can be defined such that the reference longitudinal direction and a distance line is situated therein, wherein the distance line is the line, crossing the reference longitudinal direction, of the shortest distance between two margin points, lying opposite, of margin sections of the cover or of the cover plate, which are situated opposed to one another. In an analogous manner, a reference longitudinal direction and a reference vertical plane can be defined for the opening region of the safekeeping container or of the housing.

On this basis, reference horizontal plane can be understood herein to mean a plane which stands perpendicularly on the reference vertical plane and in which the reference longitudinal direction is situated.

On this basis furthermore, "horizontal" or a "horizontal direction" can be understood herein to mean a direction which lies in a horizontal plane which is situated perpendicularly to the reference vertical plane and in which the reference longitudinal direction lies.

The direction designation "substantially horizontal" designates herein in particular a direction which occupies an angle of between −60 degrees and +60 degrees to its perpendicular line, i.e. its perpendicular projection onto the horizontal plane, proceeding from the latter. In this sense, "horizontal guide" designates in particular a guide device which permits an element guided therein to have a rectilinear movement path, the direction of which lies in the previously indicated range, or permits a non-rectilinear or a curved movement path, the direction or tangent of which lies in the previously indicated range.

The direction designation "substantially vertical" designates herein in particular a direction:
  which occupies an angle of between −60 degrees and +60 degrees to its perpendicular projection line onto a plane, on which the reference longitudinal direction stands perpendicularly, proceeding from the latter, and
  which occupies an angle of between −60 degrees and +60 degrees to its perpendicular projection line onto the reference vertical plane, proceeding from the latter.

In this sense, "vertical guide" designates in particular a guide device which permits an element guided therein to have a rectilinear movement path, the direction of which lies in the range defined by "substantially vertical", or permits a non-rectilinear or a curved movement path, the direction or tangent of which lies in the range defined by "substantially vertical". Analogously this applies to a "horizontal guide", which in particular designates a guide device which permits an element guided therein to have a rectilinear movement path, the direction of which lies in the range defined by "substantially horizontal", or permits a non-rectilinear or a curved movement path, the direction or tangent of which lies in the range defined by "substantially horizontal".

The designations "up" and "down" refer to the direction of gravity and the position of the cover plate adjustment device and in particular its cover plate on its intended installation into a supporting structure in the interior of a motor vehicle, wherein a direction which runs along the direction of gravity points "downwards".

In the device for covering a storage compartment, the cover or cover plate can be coupled in particular articulatedly with at least one guide member or guide element or a guided connection part, which is displaceably guided in at least a first guide device of the cover plate guide, arranged, coupled or fastened on the storage compartment, with a guideway into which the guide member is received. Here, the cover plate can be coupled to a guide part or actuating part, which is displaceably guided with a first end piece in at least a second guide device of the cover plate guide arranged or coupled on the storage compartment, and with a second end piece, which is situated opposed to the first end piece, is articulated on an upper region or section of the cover plate. The first guide device can be part of the cover plate adjustment device or part of the storage compartment.

In particular, the guide can be formed by at least one substantially vertical guide and at least one substantially horizontal guide. In particular, provision can be made that the first guide device for the guide member or the guided connection part is a substantially vertical guide. Provision can also be made that the second guide device is a substantially horizontal guide.

The guide member can be arranged in particular in the lower region or at the lower edge of the cover plate. The designation "in the lower region of the cover plate" can define herein in particular generally a region which is situated beneath the reference horizontal plane, when the latter is situated at a height which the said distance line intersects at a distance of a maximum of one third of its overall length, viewed from the lower edge. To simplify the kinematics of the cover plate adjustment device, provision can be made that at least one guide member is situated at a height which the said distance line intersects at a distance of a maximum of one quarter of its overall length, viewed from the lower edge.

The cover plate can be articulated at an upper region on the at least one actuating part. The designation "in the upper region of the cover plate" can define herein in particular generally a region which is situated above the reference horizontal plane, when the latter is situated at a height which the said distance line intersects at a distance of a maximum of one third of its overall length viewed from the upper edge. To simplify the kinematics of the cover plate adjustment device, provision can be made that the at least one actuating part is situated at a height which the said distance line intersects at a distance of a maximum of one quarter of its overall length viewed from the upper edge.

According to an embodiment of the cover plate adjustment device, furthermore here the cover can be pivotably connected with at least one guide strip associated with the substantially horizontal guide. In the said embodiments, the substantially horizontal guide can be arranged in the upper region of the storage compartment. In the stowage position, the cover can be received at least predominantly by the storage compartment. Here, the cover plate adjustment device has a cover, the inner side of which in the opened state forms a storage surface, wherein the cover is movable from its closed position into a horizontal storage position or into a stowage position by means of at least one guide for the formation of the storage surface, which in particular is formed by a substantially vertical guide and a substantially horizontal guide, wherein the storage compartment is at least partially open in the storage position and in the stowage position.

According to an alternative embodiment of the cover plate adjustment device to the embodiments with at least one guide strip of a first guide device, provision can be made that instead of the guide strip a guideway, extending in the same manner, is provided to receive the guide part arranged on the cover plate, and the cover is connected with at least one guide lever, which is guided displaceably on two parallel guides of a second guide device.

In the said embodiments, provision can be made that on the guideway of the first guide device for substantially horizontal guidance at least one elastic element or spring element is arranged for pressing the guide member into the detent depression.

In the said embodiments, provision can be made that a substantially horizontal guide has at least one passage opening, via which it at least at times is connected with the substantially vertical guide. Also, provision can be made in the said embodiments that the substantially horizontal guide has at least one detent depression for receiving the guide member in the storage position or in the stowage position.

According to embodiments of the invention, in each embodiment provision can be made that the guide extends, or respectively the substantially vertical guide and the substantially horizontal guide extend in or along the reference longitudinal direction of the device for covering a storage compartment or respectively the cover plate adjustment device.

According to an embodiment of the device for covering a storage compartment or the cover plate adjustment device, this has:
- a cover or cover plate for covering the storage compartment opening, having an inner side embodied as a storage surface,
- two lateral guide parts extending in the longitudinal direction of the storage compartment, for inserting into respectively a lateral guide of the storage compartment arranged in particular on an upper cover wall of the storage compartment, for guiding an in particular translatory movement of the guide parts along the longitudinal direction of the storage compartment, wherein on an end piece and in particular the front ends of the guide parts, the cover is articulated with the formation of a rotation axis,
- two guides extending transversely to the longitudinal direction of the storage compartment, which extend respectively laterally and along the opening of the storage compartment transversely to the longitudinal direction of the storage compartment in particular upwards and in particular up to the upper cover wall, wherein the cover has at least one guide member at its lower edge or at the said lower region, which is displaceably mounted in the guideway, wherein each guide part in the respective guide can be moved in the direction of the upper cover wall into a position in which the cover exposes the storage compartment opening and in which the storage surface of the cover extends along the longitudinal direction of the storage compartment, so that the storage surface of the cover is able to be used for the storing of an object.

According to an embodiment of the cover plate adjustment device, provision is made that each of the two lateral guide parts extending in the longitudinal direction of the storage compartment for inserting into respectively a lateral guide arranged in particular on an upper cover wall of the storage compartment is formed from respectively a lateral guide strip extending in the longitudinal direction of the storage compartment, which are provided for inserting into respectively a lateral guide of the storage compartment and at the front ends of which the cover is articulated. Here, in particular provision can be made that each guide strip has at least one passage opening, and wherein each of the two guides extending transversely to the longitudinal direction of the storage compartment is connected with respectively one of the guide strips such that the guide parts, which are situated in the guides extending transversely to the longitudinal direction of the storage compartment, can be introduced via the respective passage opening into the associated guide strip.

According to an embodiment of the cover plate adjustment device, provision is made that each guide strip has a detent depression, into which the respective guide member can be inserted when the latter is moved in the respective guide (40) in the direction of the guide strip which is arranged at the respective guide, so that with a guide member inserted in each of the detent depressions, the guide strips can be displaced in the guides, in order to move the cover into a position in which the latter exposes the storage compartment opening and is moved into the storage compartment, and in which the storage surface of the cover is able to be used for the storage of an object. Here, provision can be made that at each of the guide strips at least one elastic element or spring element is arranged for the pressing in of the guide member into the detent depression.

According to an alternative embodiment of the cover plate adjustment device to the embodiments with at least one guide strip, provision can be made that the two lateral guide parts extending in the longitudinal direction of the storage compartment are respectively realized by a guide lever, which is able to be coupled to the respective lateral guide of the storage compartment such that it carries out translatory movements along the longitudinal direction of the storage compartment, so that the cover is connected with the two guide levers, which is guided displaceably on two parallel guides, wherein at the front ends of the guide levers the cover is articulated with the formation of a rotation axis.

Provision can be made here that the device for covering a storage compartment is connected to respectively an additional guide arranged in the upper region of the storage compartment and extending in the longitudinal direction of the storage compartment, such that the respective guide member is able to be introduced by the guide extending transversely to the longitudinal direction of the storage compartment via a respective passage opening into the additional guide arranged in the upper region of the storage compartment and vice versa, so that the cover can be moved into a position in which it exposes the storage compartment opening and is moved into the storage compartment, and in which the storage surface of the cover is able to be used for the storage of an object.

According to an embodiment of the cover plate adjustment device with a guide lever, provision can be made that each guide lever is formed from:
  a first lever arm extending transversely to the longitudinal direction of the storage compartment, which lever arm is guided at its lower end into a guide arranged in the lower region of the storage compartment and extending along the longitudinal direction of the storage compartment,
  a second lever arm fastened to the first lever arm, which second lever arm extends from the lower end of the first lever arm in the direction of the region of the opening to a front end, wherein the front end of the respective second lever arm is situated, wherein at the front ends of the respective second lever arm the cover is articulated with the formation of a rotation axis.

According to a further aspect of the invention, a storage compartment device is provided, having:
  a housing with a lower base wall, an upper cover wall, which lies opposite the lower base wall, a rear back wall connecting the lower base wall and the upper cover wall, and a first and a second lateral wall, which respectively connects on sides of the housing lying opposite one another the lower base wall and the upper cover wall and the rear back wall, so that the housing exposes an opening in a front region thereof,
  a device for covering a storage compartment according to one of the preceding claims.

Through the fact that the cover is able to be moved from its closed position by means of at least one guide for the formation of the storage surface firstly into a horizontal storage position and subsequently optionally into a stowage position, wherein the storage compartment is at least partly opened in the storage position and in the stowage position, the advantage is produced, compared with the cover mentioned in the introduction which is only able to be folded via a simple hinge axis, that the storage compartment is also able to be completely exposed through the additional stowage position, without the cover extending here into the interior of the vehicle. Furthermore, through an arrangement at the height of the upper region of the storage compartment, the storage surface can be arranged higher than in the typical connection in hinge form close to the lower edge of the cover, which can be very useful for the placing of objects such as for example a notebook, a tablet PC, a smartphone, a screen or a keyboard or another input device.

The cover is preferably provided with at least one guide member which is displaceably guided in the at least one guide. The guides are preferably formed by a substantially vertical guide and by a substantially horizontal guide. The substantially vertical guide preferably has at least one passage opening, via which it is connected at least at times with the substantially vertical guide, so that the guide member, preferably arranged close to the lower end of the cover, for reaching the horizontal storage position and for moving into the horizontal stowage position can pass from the substantially vertical guide into the substantially horizontal guide.

According to a first variant, the substantially horizontal guide preferably has at least one guide strip, on which the cover is preferably articulated by its upper end. The guide strip is in turn preferably mounted displaceably in a guide formed by several rollers or optionally in a telescopic sliding guide. The substantially horizontal guide is arranged here particularly preferably in the upper region of the storage compartment.

According to an alternative embodiment, the horizontal guide is undertaken by at least one guide lever, which is guided displaceably with guide members in two substantially horizontal guides spaced apart from one another.

According to a particularly advantageous configuration, the cover in the stowage position is received at least predominantly by the storage compartment. A complete receiving of the cover is particularly preferred here, so that the storage compartment in the stowage position is accessible in a completely unimpeded manner.

According to an advantageous further development, the substantially horizontal guide has at least one detent depression which serves for receiving the guide member in the storage position or in the stowage position. For the self-inhibiting arresting of the guide member in these positions, further preferably there is associated with each detent depression a spring element or an elastically flexible element, which presses the guide member under slight pressure into the detent depression and secures it there until this pressure is overcome by an actuation force.

The explanations concerning one of the aspects of the invention, in particular concerning individual features of this aspect, apply accordingly also in an analogous manner to the other aspects of the invention. When in this application mention is made of "substantially vertical", this also refers to the arrangement illustrated by way of example in the figures in which the guides can also have an inclination in accordance with the contour of the instrument panel in this region. Likewise, the designation "substantially horizontal" which is used is also to incorporate inclinations. Such designations are therefore not to discernibly restrict the scope of protection of the patent for the specialist in the art.

BRIEF DESCRIPTION OF THE DRAWINGS

Embodiments and example embodiments of the invention are explained in further detail below by way of example with the aid of the enclosed drawings. The individual features arising therefrom are, however, not restricted to the individual embodiments and example embodiments, but rather can be combined with individual features described further above and/or with individual features of other embodiments and example embodiments. The details in the drawings are to be interpreted as being only explanatory, but not restrictive. The reference numbers contained in the claims are in no way intended to restrict the scope of protection of the invention, but rather refer merely to the embodiments shown in the drawings. The drawings show in:

FIG. 9 a diagrammatic three-dimensional illustration of the storage compartment device according to FIG. 1 in the position of the cover plate of FIG. 4;

FIG. 10 a diagrammatic lateral section illustration along the reference longitudinal direction through a further embodiment of a storage compartment device with a storage compartment and an embodiment of a cover plate adjustment device with a cover plate, wherein the latter is situated in the closed position, in which an opening region of the storage compartment is covered, in particular in order to close the storage compartment;

DETAILED DESCRIPTION OF EMBODIMENTS

Figure 1:
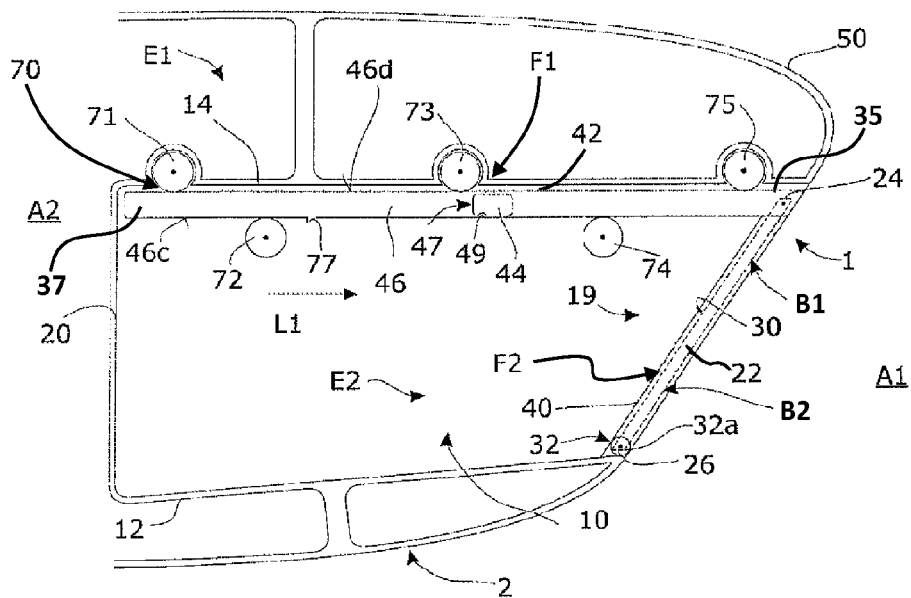
FIG. 1 a diagrammatic lateral section illustration along the reference longitudinal direction along the section line S1-S1 of FIG. 5 of an embodiment of a storage compartment device with a storage compartment and an embodiment of a cover plate adjustment device with a cover plate, wherein the latter is situated in the closed position, in which an opening region of the storage compartment is covered, in particular in order to close the storage compartment.

In FIGS. 1 to 10 a first embodiment is illustrated of a storage compartment device 2 with a cover plate adjustment device 1 or device for covering a storage compartment 10. The storage compartment 10 is mounted on a supporting structure 3 in the interior of a motor vehicle, or is integrated therewith, and can be embodied in particular as a glove compartment, which is arranged on an instrument panel 50 or is fastened thereon. The storage compartment 10 is delimited by a lower base wall 12, optionally an upper cover wall 14, a left lateral wall 16, a right lateral wall 18, a back wall 20 and a front cover or a cover or cover plate 22. Between the lateral walls 16, 18 and lying opposite the back wall 20, an opening region 19 is formed on a front side A1, which region is covered by the cover plate 22 in its closed state. Therefrom, a longitudinal direction L1 of the cover plate adjustment device 1 is defined, directed from a rear side A2, at which the back wall 20 is situated, to the front side A1.

Figure 3:
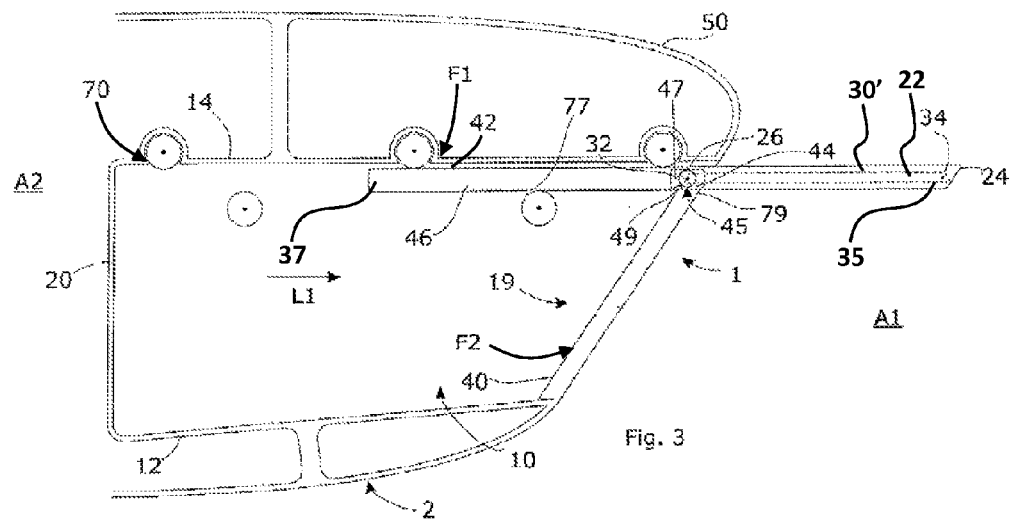
FIG. 3 the embodiment of a storage compartment device according to FIG. 1 in the illustration thereof, wherein the cover plate is situated in a maximum drawn-out position with completely opened opening region of the storage compartment with the provision of a storage surface on its inner side.
Figure 4:
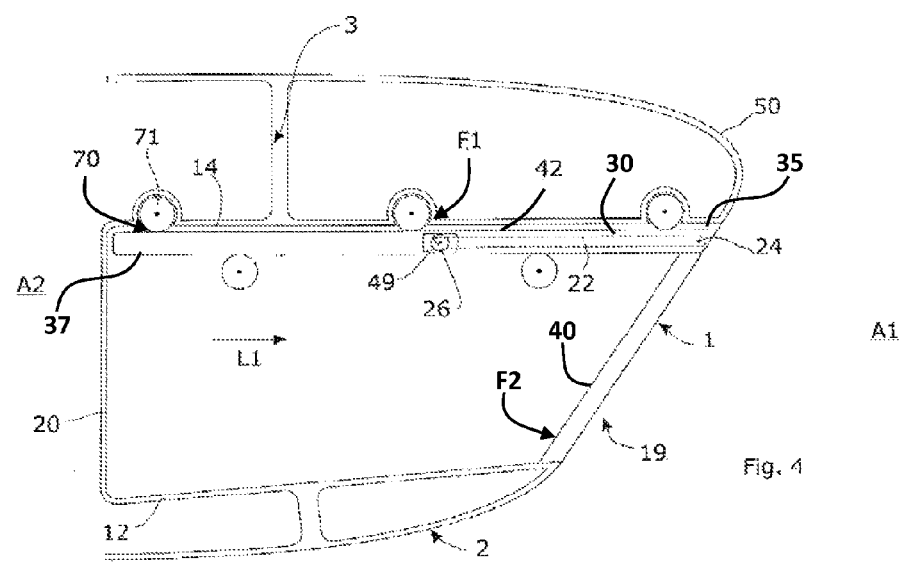
FIG. 4 the embodiment of a storage compartment device according to FIG. 1 in the illustration thereof, wherein the cover plate is situated in the stowage position with opened opening region of the storage compartment.
Figure 5:
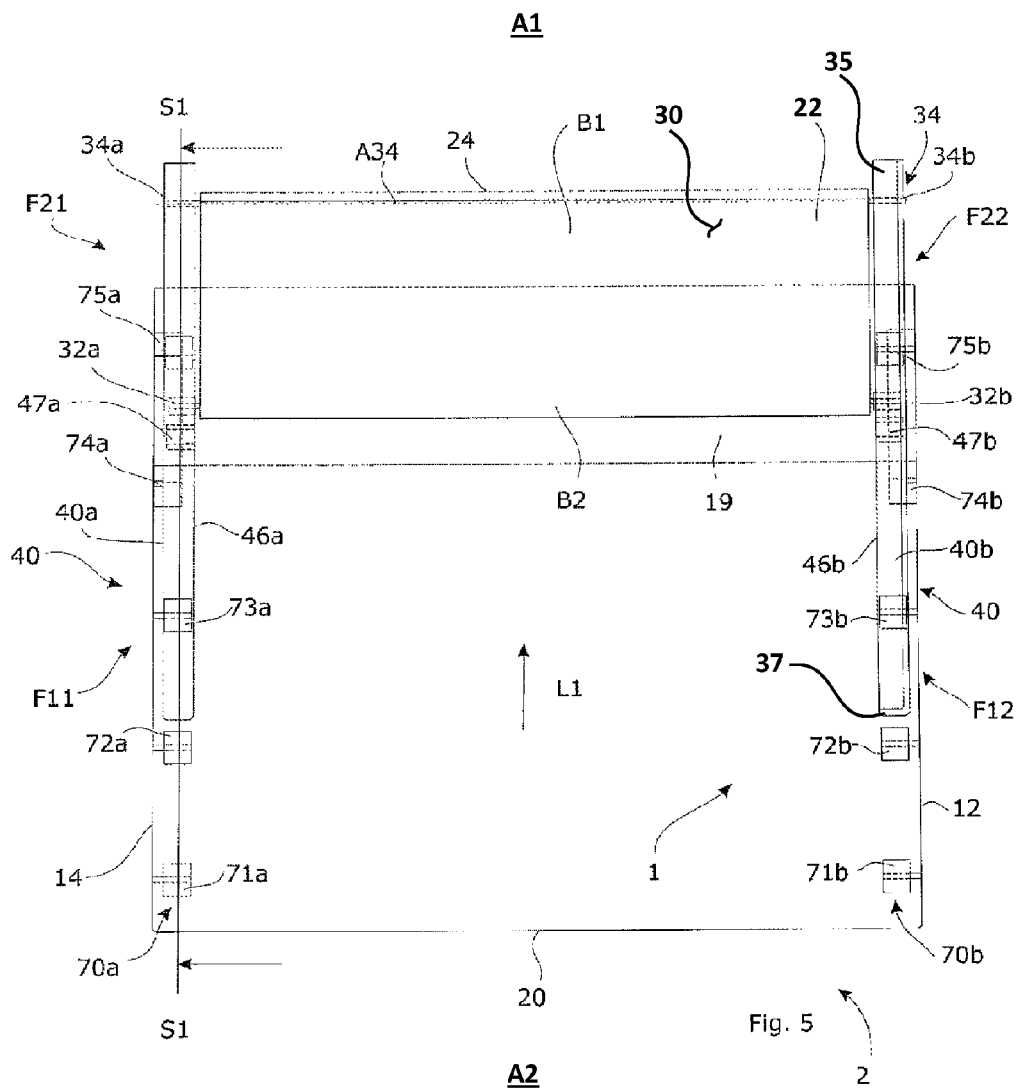
FIG. 5 a diagrammatic section illustration in top view onto the embodiment of the storage compartment device according to FIG. 1 in the position of the cover plate of FIG. 2.
Figure 6:
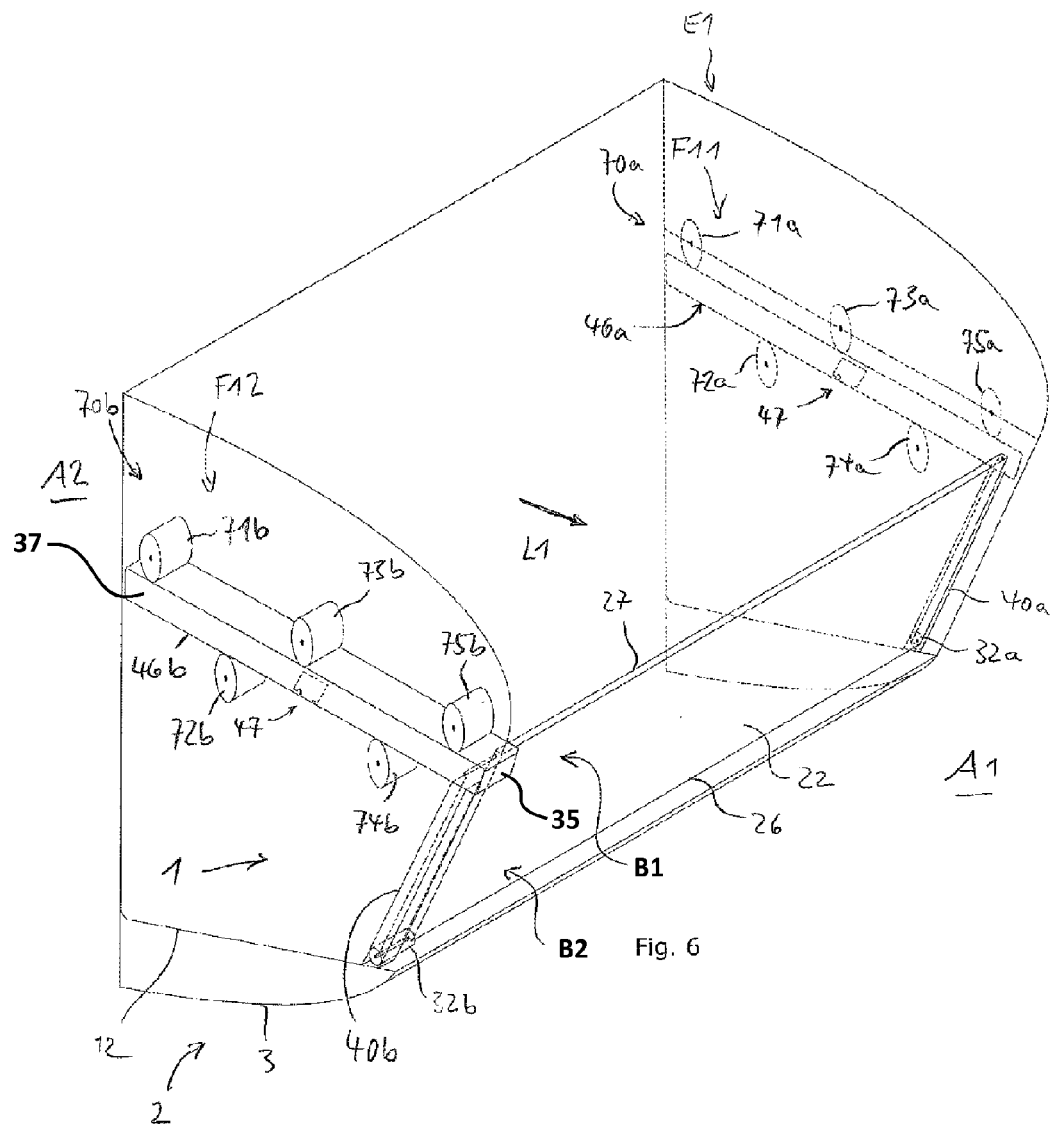
FIG. 6 a diagrammatic three-dimensional illustration of the storage compartment device according to FIG. 1 in the position of the cover plate of FIG. 1.
Figure 7:
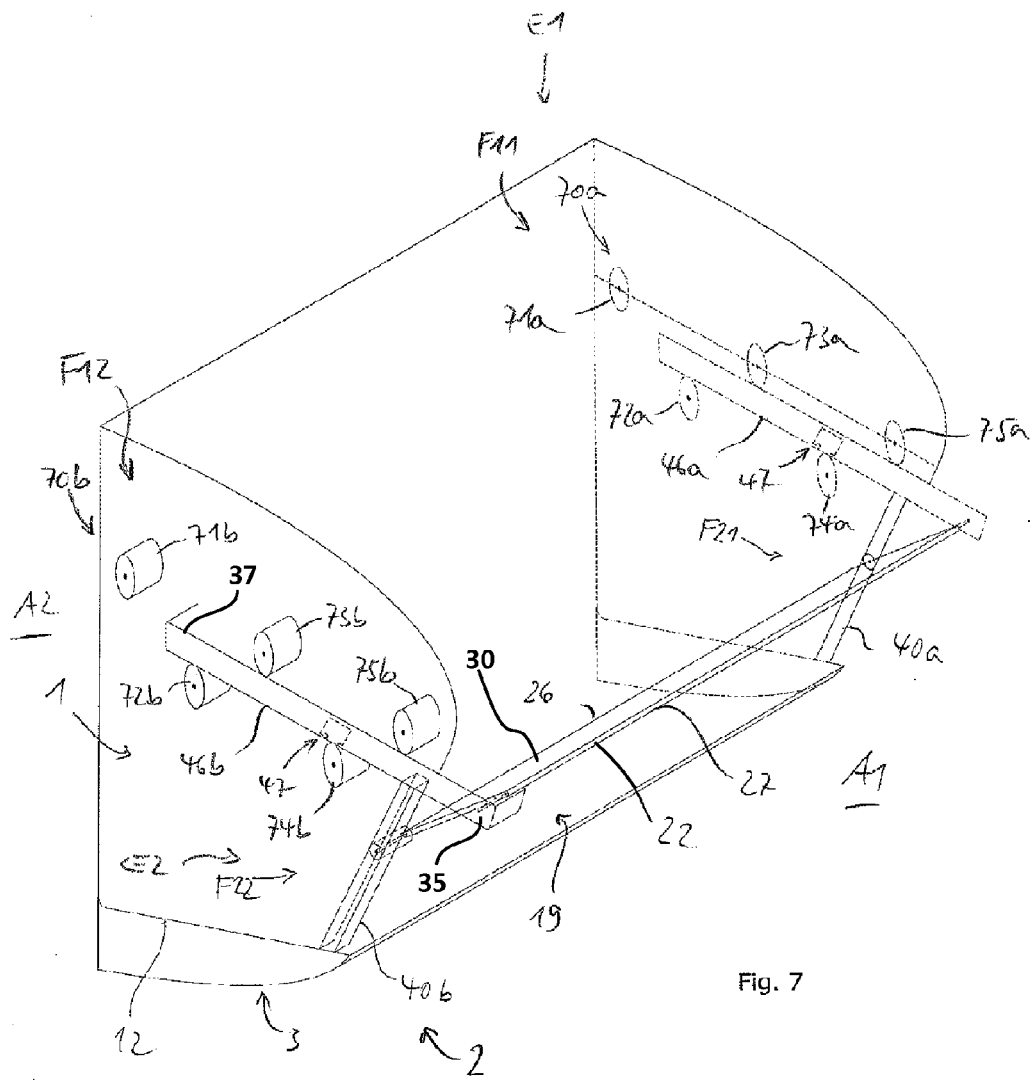
FIG. 7 a diagrammatic three-dimensional illustration of the storage compartment device according to FIG. 1 in the position of the cover plate of FIG. 2.

The embodiment of the cover plate adjustment device 1 shown in FIGS. 1 to 9 has a first guide device F1 and a second guide device F2. In the illustrated embodiment, the first guide device F1 is realized in the region of the lateral walls 16 or respectively 18 of the storage compartment 10 as upper, substantially horizontal guides 42, and the second guide device F2 is realized as substantially vertical guides 40 running close to the front edge of the lateral walls 16 or respectively 18. In FIG. 5, the upper guides 42 are designated by the reference numbers 42*a* or respectively 42*b*, and the vertical guides are designated by the reference numbers 40*a* or respectively 40*b*.

For the movement of the cover plate 22 for opening and closing the opening region 19, a first guide arrangement E1 is provided with a first guide device F1, and a second guide arrangement E2 is provided with a second guide device F2.

Figure 2:
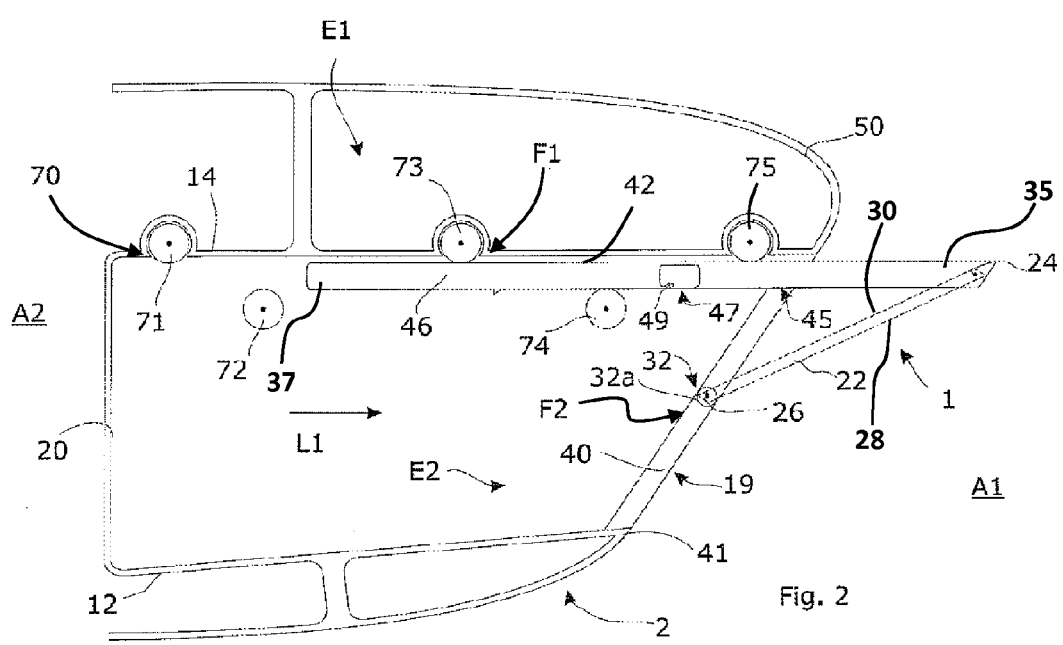
FIG. 2 the embodiment of a storage compartment device according to FIG. 1 in the illustration thereof, wherein the cover plate is situated in a partly opened position.

In the embodiments according to FIGS. 1 to 9, the first guide arrangement E1 is formed from at least one guide mount or guideway 70, arranged on the storage compartment or on a fastening device thereof, and the first guide device F1 of the cover plate adjustment device 1 coupled therewith, which is formed by a guide strip or guide plate 46 movably guided in the guide mount or guideway 70 between a retracted position (FIG. 1) and an extended position (FIG. 3). In the following, principally a guide strip 46 will be assumed. The guide mount or guideway 70 can be arranged, as illustrated, on the storage compartment 10 or on a fastening device thereof, such as in particular the supporting structure 3. Alternatively, the guide mount or guideway 70 can also be a component of the guide device F1 of the cover plate adjustment device 1. In the illustrated embodiment, the guide mount or guideway 70 is formed from five guide rollers 71, 72, 73, 74, 75, which free a movement space, viewed along the longitudinal direction L1, in which the guide strip 46, lying on at last a portion of the five guide rollers 71, 72, 73, 74, 75, is able to be moved. Here, upper guide rollers 71, 73, 75 are provided for abutment against an upper contact surface of the guide strip 46, and lower guide rollers 72, 74 for abutment against a lower contact surface of the guide strip 46. In a variant of this embodiment, a different number to five guide rollers can be provided. In a further variant, instead of the guide rollers an upper contact rail can be provided for abutment against the upper contact surface of the guide strip 46, and a lower contact rail for abutment against the lower contact surface of the guide strip 46. Here, also, instead of the upper contact surface or the lower contact rail, a plurality of guide rollers can be provided. The first guide device F1 has, in addition, an articulation device 34, by which the cover plate 22 is articulated on the guide strip 46 in an articulated manner with the formation of an articulation axis 34. Preferably, the articulation device 34 or respectively the articulation axis 34 is arranged on the upper edge 24 or within the upper region B1 designated herein of the cover plate 22 and/or at an end 35 of the guide strip.

The first guide arrangement E1 can, as described above, have a guide mount or guideway 70 and the first guide device F1, coupled therewith, for the movement of the cover plate 22. In the embodiment of the storage compartment device 2 according to FIGS. 1 to 9, the first guide device F1 is formed from two part guide devices F11, F12, and guide mounts or guideways 70*a* or respectively 70*b* received respectively thereby, which has respectively five guide rollers 71*a* or respectively 71*b*, 72*a* or respectively 72*b*, 73*a* or respectively 73*b*, 74*a* or respectively 74*b*, 75*a* or respectively 75*b* and here upper guide rollers 71*a* or respectively 71*b*, 73*a* or respectively 73*b*, 75*b* or respectively 75*b* for abutment against an upper contact surface of the guide strip 46 and lower guide rollers 72*a* or respectively 72*b*, 74*a* or respectively 74*b* for abutment against a lower contact surface of the guide strip 46 (FIG. 5). The two part guide devices F11, F12 are arranged here such that the cover plate 22 in top view onto the cover plate adjustment device 1 or viewed in the longitudinal direction L1 is situated between these.

In the embodiments according to FIGS. 1 to 9, the second guide device F2 has in particular the guide strip or guide plate 46, a guideway or guide 40, a guide member or guide part guided therein or thereon as a guide element 32. The guideway 40 is fastened on the supporting structure 3 or of the storage compartment 10 on the front side S1 of the storage compartment 10 or a fastening device of the supporting structure 3, or fixed in position, i.e. coupled immovably with respect thereto. The guideway 40 extends from a lower margin region 41 of the supporting structure 3 or of the storage compartment 10 on the front side A1 of the storage compartment 10 or a fastening device of the supporting structure 3 is constructed, wherein the lower margin region 41 forms a lower boundary section of the opening region 19. The guide member or guide element 32 is arranged on the cover plate 22 and is configured such that this is guided along the extent of the guideway 40 along the longitudinal direction L1 therefrom or thereon. The guide part 32 is arranged at a site of the cover plate 22 which with extended position of the cover plate 22, viewed in the longitudinal direction L1, lies at a distance from the site at which the articulation device 34 or respectively the articulation axis 34 is arranged. The distance in the extent of the cover plate 22 can be in particular at least a quarter of the length of the extent of the cover plate 22 along the longitudinal direction L1. Preferably, the guide part 32 is situated at the lower edge 26 or the "lower" region of the cover plate 22 designated herein. This can be embodied in roller form or ball form and be fastened in a rotation-proof manner on the cover plate 22 or mounted rotatably on the cover plate 22. The guideway 40 can be embodied as a hollow profile such that the guide part 32 is guided movably within the hollow profile along the longitudinal extent of the guideway 40. The guide part 32 can also be embodied as a pair of guide elements in roller form or ball form, between which the guideway 40 is held, so that the guide part 32 is guided along the longitudinal extent of the guideway 40 movably thereon.

In the embodiments with a first guide device F1 and a second guide device F2, the first guide device F1 couples an upper region B1 of the cover plate 22 movably onto the storage compartment 10 or a fastening device thereof, and the second guide device F2 couples a lower region B2 of the cover plate 22 movably onto the storage compartment 10 or a fastening device thereof.

The second guide arrangement E2 can, as described above, have a guideway 40, which can be part of the storage compartment 10 or the fastening device thereof or part of the second guide device F2, and a guide part 32 coupled therewith. In the embodiment of the storage compartment device 2 actually illustrated in FIGS. 1 to 9, the second guide device F2 is formed from two part guide devices F21, F22 respectively with a guideway 40 and a guide part 32 (FIG. 5). The two part guide devices F21, F22 are arranged here such that the cover plate 22 in top view onto the cover plate adjustment device 1 or viewed in the longitudinal direction L1, is situated between these. This can also be provided in an analogous manner in the embodiments according to FIGS. 10 to 17.

Therefore, the device 1 for covering the opening region 19 has the cover plate 22, the first guide device F1 and the second guide device F2, wherein in particular the first guide device F1 couples an upper region B1 of the cover plate 22 movably onto the storage compartment 10 or onto a fastening device thereof or the supporting device 3 and the second guide device F2 couples a lower region B2 of the cover plate 22 movably onto the storage compartment 10 or onto a fastening device thereof or the supporting device 3. Here, the first guide device F1 and the second guide device F2 are embodied in particular such that the cover plate 22 is movable from its closed position by means of at least one cover plate guide 40, 42 for the formation of the storage surface 30' into a horizontal storage position, or that the cover plate 22 is movable into a stowage state or stowage position, wherein the cover plate 22 exposes the opening region 19 in the storage position and in the stowage position entirely or partly.

In the embodiment of the storage compartment device 2 actually illustrated in FIGS. 1 to 9, the cover plate 22 has an outer side or outer surface 28 and an inner side or inner surface 30, and a lower rim or a lower edge 26 with respect to the direction of gravity, and an upper rim or an upper edge 24 situated opposed to the lower rim 26. The cover plate 22 is provided close to its lower edge 26 on both sides with respectively a guide member 32. The guide members 32, which are designated in the figures also individually by the reference numbers 32a and 32b, are mounted displaceably in the substantially vertical guides 40.

The cover plate 22 is pivotably articulated close to its upper edge 24 on both sides by means of a rotation axis 34 on a guide strip 46 or respectively 46a, 46b, which is displaceably mounted in the substantially horizontal guide 42. The guide strips 46 have opposite ends 35, 37 and are guided displaceably by several guide rollers 71, 72, 73, 74, 75, so that they are able to be lowered completely in the storage compartment 10 or are able to be drawn out therefrom to such an extent that the rotation axis 34 is guided out so far in the direction towards the vehicle interior, that the cover plate 22 can reach its almost horizontal storage position according to FIG. 3.

Figure 8:
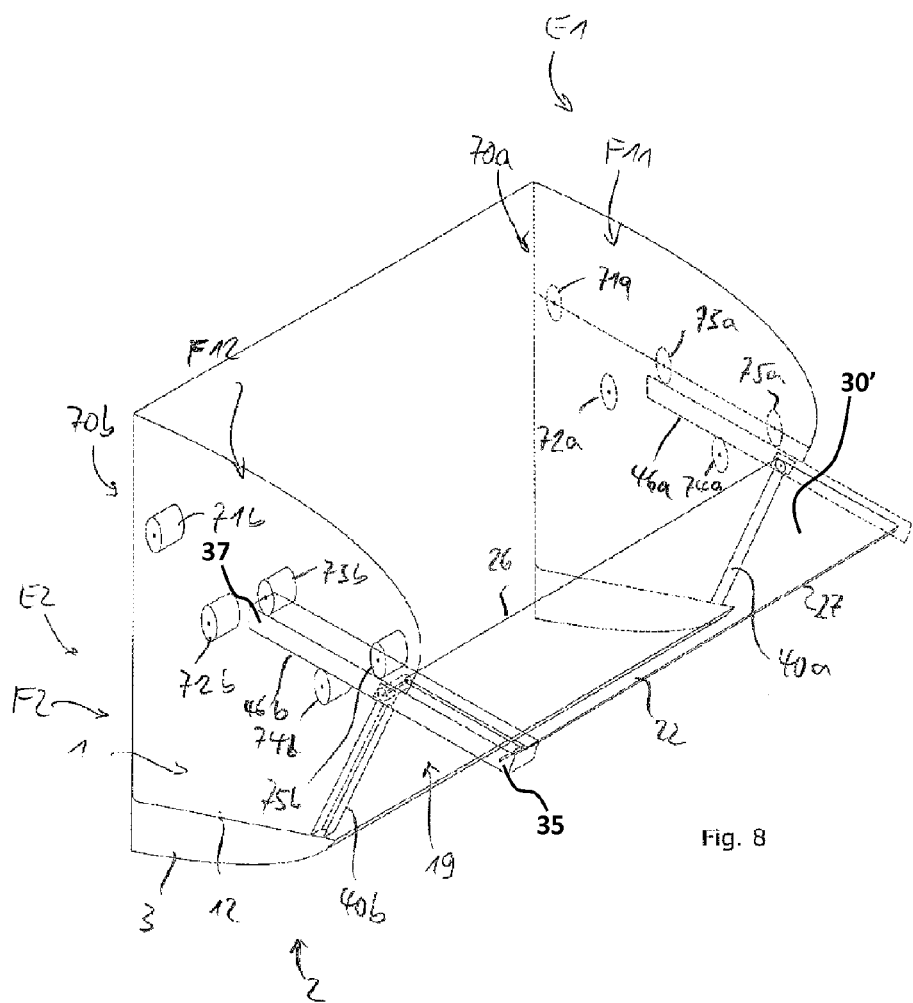
FIG. 8 a diagrammatic three-dimensional illustration of the storage compartment device according to FIG. 1 in the position of the cover plate of FIG. 3.
Figure 11:
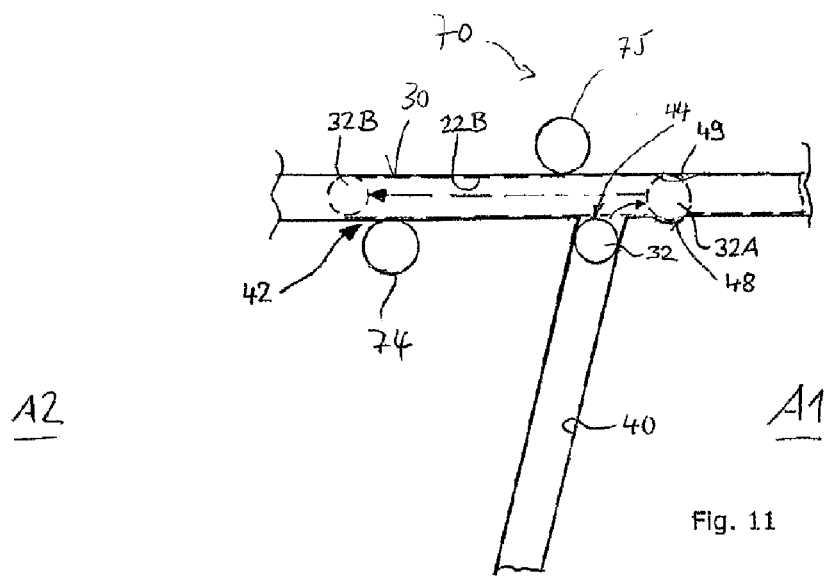
FIG. 11 a diagrammatic enlarged illustration of the transition region, marked in FIG. 10 by the denotation "XI", of the vertical and the horizontal guide of the cover.

The guide strip 46 or respectively 46a, 46b is embodied with a mounting profile—illustrated as a hollow profile. The guideway 40 or respectively 40a, 40b has at an upper end 79 an opening 45, which is situated and constructed such that a passage opening 44 of the guide strip 46 or respectively 46a, 46b in a particular position of the guide strip 46 or respectively 46a, 46b viewed in the longitudinal extent of the respective guideway 40 or respectively 40a, 40b, is situated beneath the passage opening 44 (FIGS. 3 and 8). In this position, the interior of the guideway 40 or respectively 40a, 40b is connected with the interior of the respective guide strip 46 or respectively 46a, 46b. Therefore, the guide part 32, which is guided movably along the longitudinal extent of the respective guideway 40 or respectively 40a, 40b on or in the latter, can enter from the respective guideway 40 or respectively 40a, 40b into the interior of the guide strip 46 or respectively 46a, 46b connected respectively to the guideway 40 or respectively 40a, 40b, and vice versa.

The cover 22 will be guided here with the guide members 32 or respectively 32a, 32b out from the closed position illustrated in FIGS. 1 and 5 via the part opening position illustrated in FIG. 2 with the guide members 32 or respectively 32a, 32b in the guides 40 or respectively 40a, 40b upwards, wherein the cover plate 22 at the same time is transferred by the guide strips 46 or respectively 46a, 46b by means of the connection via the rotation axes 34 gradually into a substantially horizontal position (FIGS. 3 and 8). Having arrived at the upper end of the guides 40 or respectively 40a, 40b, the guide members 32 or respectively 32a, 32b are transferred through passage openings 44 constructed in the guide strips 46 or respectively 46a, 46b into the horizontal guides 42. The passage openings 44 are arranged on the undersides of the horizontal guides 42 or respectively the guide strips 46 so that on reaching an almost horizontal position of the cover plate 22 they overlap with the openings 45 of the upper ends 79 of the guides 40.

In the storage position illustrated in FIG. 3, the inner side 30 of the cover plate 22 serves as an additional shelf, wherein the guide strips 46 continue to support the cover plate 22 in a stable manner over a portion of the guide rollers 71, 72, 73, 74, 75. In order to also hold the cover plate 22 horizontally here in a stable position, a detent device and in particular a depression or detent depression 47 can be constructed here on the underside of the guide strips 46, into which detent depression the respective guide member 32 can be inserted on reaching the storage position illustrated in FIG. 3. The respective guide part 32 is held in a position introduced into the respective guide strip 46 by at least one additional elastic element or spring element 49, which is arranged in the opening or in the entry region 47a opposite the detent depressions 47 at the lower region of the guide strips 46, so that this guide part can only be moved downwards again out from the detent depressions 47 on application of a certain actuation force which is greater than the normal forces resulting from acceleration and braking forces of the vehicle.

The guide strips 46, or at least one guide strip 46, can have on its underside 46c and/or its upper side 46d at least one detent device 77, by which a position of the respective guide strips 46 is able to be set on the guide device 70 and in particular one of the positions defined herein, in a stable manner, that the guide strip 46 by application of a defined external maximum force can be moved out from this respective position.

The cover 22 can also be moved from the storage position illustrated in FIG. 3 in horizontal position into a stowage position according to FIG. 4, in which it is received with the guide strips 46 preferably completely by the storage compartment 10. For this stowage position, additional detent depressions 48 can be provided accordingly on the underside of the guide strips 46, and on the upper side accordingly additional spring elements 49 can be provided. The cover plate 22 can optionally, however, also be moved at the same time with the guide strips 46 into the stowage position according to FIG. 4, so that the same detent depressions 48 as for the storage position according to FIG. 3 are also effective here. For passing the passage openings 44 on displacing the cover plate 22 from the storage position according to FIG. 3 into the stowage position according to FIG. 4, these can be optionally at least partially closed by displaceable parts which are not shown. In the simplest case, however, a slight pressure from above is sufficient for this onto the upper edge 24 forming the front edge of the cover plate 22 in the horizontal position.

For guiding the guide members 32 back from the guide strips 46 through the passage openings 44 into the substantially vertical guides 40, these displaceable parts are then pushed to the side or swivelled again in the manner of a deflector. In the simplest case also a slight pressure from below is sufficient for this onto the upper edge 24 forming the front edge of the cover plate 22 in the horizontal position.

Alternative embodiments of the invention to the above-mentioned embodiments are illustrated in FIGS. 10 to 17. Here, all parts having comparable function were given the same reference numbers as in the first example embodiment according to FIGS. 1 to 9. Also in the embodiments of FIGS. 10 to 17, as described above, for moving the cover plate 22 for opening and closing the opening region 19 a first guide arrangement E1 is provided with a first guide device F1 and a second guide arrangement E2 is provided with a second guide device F2.

The first guide device F1 can be embodied as the first guide device F1 according to FIGS. 1 to 9. In FIG. 10 this is realized as guideway 58, into which the operating part 32 is able to be introduced. The guideway 58 is to be regarded as optional in these embodiments.

The second guide device F2 can be embodied in particular as described by means of the embodiment according to FIGS. 1 to 9, in particular having: the guideway 40, the guide part 32 arranged onto the cover plate 22. Instead of the guide strip or the guide plate 46, the second guide device F2 has an operating part which is realized as a guide lever 53.

In the embodiment according to FIGS. 10 to 16, the second guide arrangement E2 has two guideways 52, 54, in which the guide lever 53 is guided. Thereby, with each displacement position of the guide lever 53 also its position relative to the storage compartment 10 is clearly determined In the embodiment according to FIG. 17, the second guide arrangement E2 has a guideway 54, in which the guide lever 53 is guided, wherein through the connection, secure with respect to movement, of the lever arm 61 and of the guide part 62 with each displacement position of the guide lever 53, also its position relative to the storage compartment 10 is clearly determined Instead of with guide strips 46, the cover plate 22 in the second embodiment according to FIGS. 10 to 17 is articulated with the rotation axes 34, arranged close to its upper edge 24, on both sides respectively on a guide lever designated as a whole by 53, the guide lever extending between opposite ends 35 and 37.

The two guide levers 53 are formed respectively by a substantially vertical lever arm 531 and a lever arm 532 rigidly connected with the latter via a connecting guide 533 and rising obliquely forward.

At its upper end, each vertical lever arm 531 is connected with an upper guide member 55. The upper guide members 55 are guided displaceably in two substantially horizontal upper guides 52 arranged on both sides of the storage compartment 10.

At its lower end 56, each vertical lever arm 531 is connected with a lower guide member 57. The lower guide members 57 are guided displaceably in two substantially horizontal lower guides 54 arranged on both sides of the storage compartment 10.

At the upper end of the lever arms 532, which rise obliquely forward, the latter are connected pivotably with the cover plate 22 via the rotation axes 34 at the end 35 of the guide lever 53.

The lower end of the cover plate 22 is provided or connected on both sides with respectively a guide member 32 in an analogous manner to the first example embodiment according to FIGS. 1 to 7. The guide members 32 are guided displaceably e.g. in substantially vertical guides 40 arranged close to the front edge of the storage compartment 10 on both sides on or close to the side walls 16.

In an embodiment according to FIGS. 10 to 16, two lateral guide parts extending in the longitudinal direction of the storage compartment are realized respectively in the form of a guide lever 53, which is able to be coupled to the respective lateral guide 52, 54 of the storage compartment 10 such that it carries out translatory movements along the longitudinal direction of the storage compartment, so that the cover 22 is connected with the two guide levers 53, which is guided displaceably on two guides 52, 54 parallel to one another, wherein the cover 22 is articulated on the front ends 35 of the guide levers 53 with the formation of a rotation axis 34.

The interior of the guideway 40 is connected with the interior of the guideway 58, that the guideway 40 opens via an opening 45 at its upper end into an opening 59 of the guideway 58, so that the guide part 32 can be introduced from the guideway 40 into the guideway 58 and vice versa.

Figure 13:
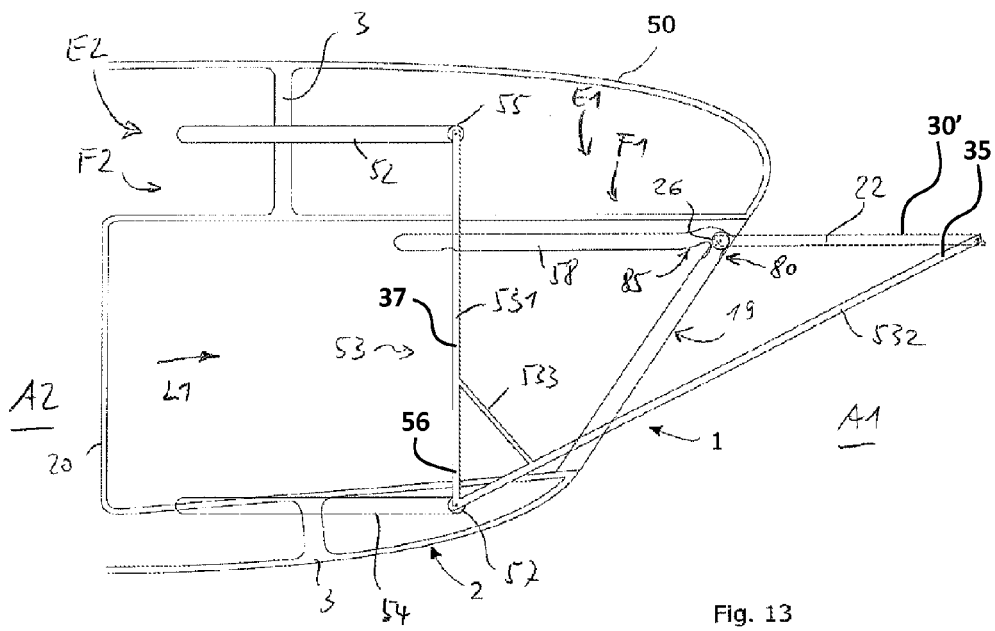
FIG. 13 the embodiment of a storage compartment device according to FIG. 11 in the illustration thereof, wherein the cover plate is situated in a maximum drawn-out position with completely opened opening region of the storage compartment with the provision of a storage surface on its inner side.
Figure 14:
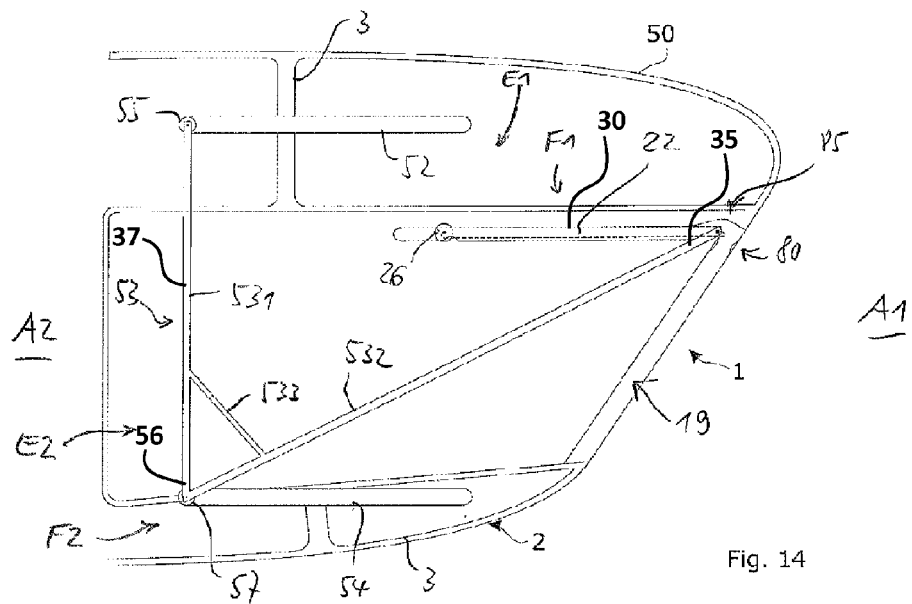
FIG. 14 the embodiment of a storage compartment device according to FIG. 11 in the illustration thereof, wherein the cover plate is situated in the stowage position with opened opening region of the storage compartment.
Figure 15:
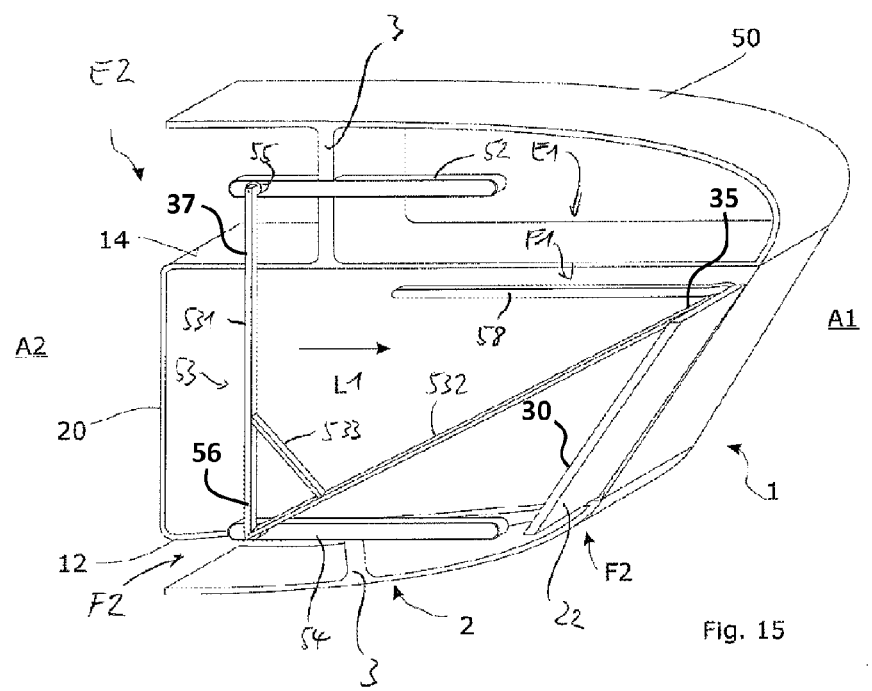
FIG. 15 a diagrammatic three-dimensional partial illustration of the storage compartment device according to FIG. 10 in the position of the cover plate of FIG. 10.
Figure 16:
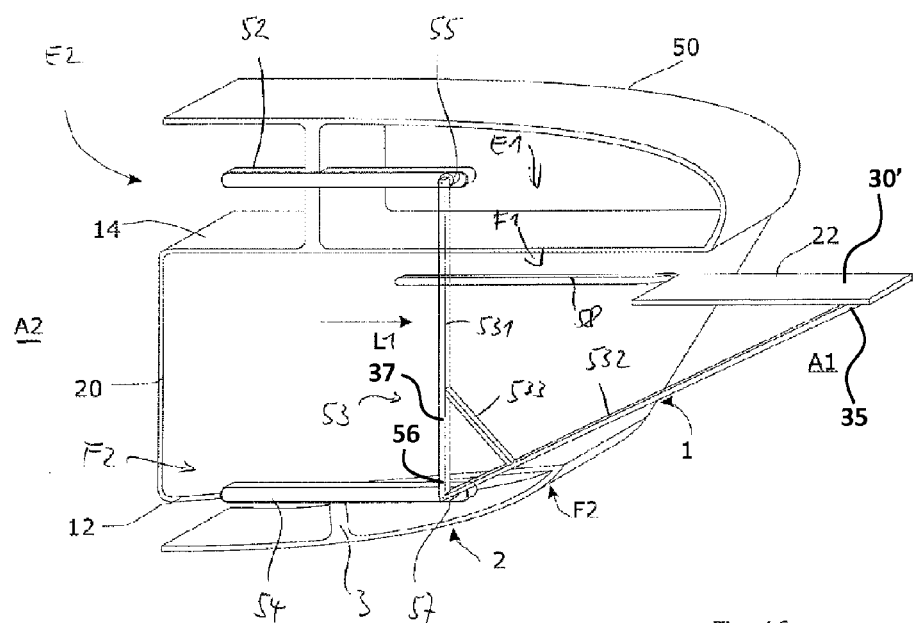
FIG. 16 a diagrammatic three-dimensional partial illustration of the storage compartment device according to FIG. 10 in the position of the cover plate of FIG. 13.

At the upper end of the guideway 40 and in particular in its interior, a detent device 80 can be constructed. This can be realized by a constriction, in particular by the provision of at least one elastic support on the inner surface of the guideway 40 for constricting the internal cross-section thereof. Here, the detent device 80 is provided such that the guide part 32 in the state of FIG. 13 is held in a stable position of rest. Also, a detent device 85 can be constructed at the end of the guideway 58, which lies at the upper end of the guideway 40. The detent device 85 can be constructed as a curvature of the guideway 58, such that from the stable position of rest of the guide part 32 according to FIG. 13, the guide part 32 must be moved by a small rise towards the back wall 20, which therefore contributes to the stabilizing of the guide part 32 in its "stable position of rest". Also, the detent device 80 can be constructed as the detent device 85.

Figure 12:
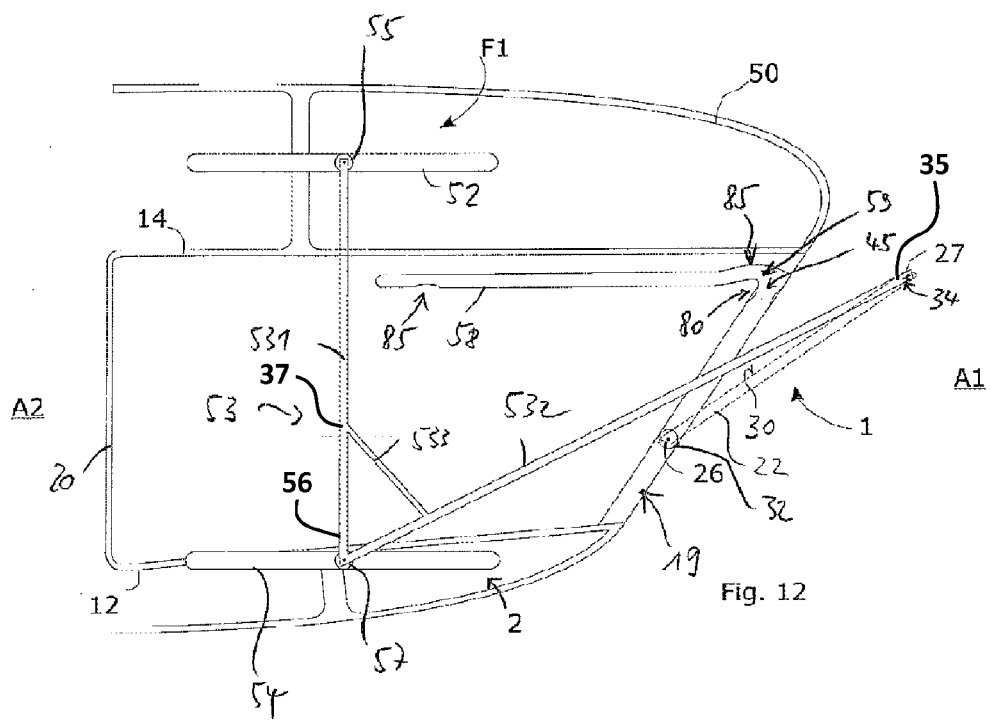
FIG. 12 the embodiment of a storage compartment device according to FIG. 11 in the illustration thereof, wherein the cover plate is situated in a partly opened position.

In the upper part of the storage compartment 10 optionally on both sides an additional horizontal guide 58 is also provided, which in the same manner as the horizontal guide 42 illustrated in FIG. 1 is connected via a passage opening 44 with the substantially vertical guide 40, so that the guide members 32 of the cover plate 22, after reaching a substantially horizontal storage position according to FIG. 12, can pass from the vertical guide 40 into the horizontal guide 58. Along the guides 58, the cover plate 22 can be moved from the storage position according to FIG. 10 also into the stowage position illustrated in FIG. 13, in which the storage compartment 10 is exposed towards the front, without the cover plate 22, in so doing, projecting into the interior of the vehicle.

To open the cover, the guide lever 53 is guided forwards with the guide members 55 and 57 along the guides 52 and 54. Here, the oblique lever arm 532 travelling linearly forwards and the guide member 32 sliding upwards at the same time in the guide 40 guide the cover 22 out from the closed position shown in FIG. 10 via the part opened position shown in FIG. 12 into the horizontal storage position according to FIG. 13. The drive can take place manually by the manual force of a user via a handle or a recessed grip arranged on the cover, so that all guide elements (lever arm 53, guides 40 and 58) only serve passively for the guidance of the cover. The drive can, however, also take place in a more comfortable variant by means of a preferably electric drive, which is not illustrated. This drive then preferably also controls a deflector, not illustrated, arranged in the region of the passage opening 44, which optionally enables a transition between the substantially vertical guide 40 and the substantially horizontal guide 58 (or respectively the guide 42 in the first example embodiment), or controls a horizontal travel over the passage opening 44 on moving into the stowage position or from the stowage position (FIG. 14) into the storage position (FIG. 13).

On proceeding by means of an electric drive, the detent depressions 48 and the spring elements 49 are superfluous, in so far as this drive has a sufficient self-inhibition.

Figure 17:
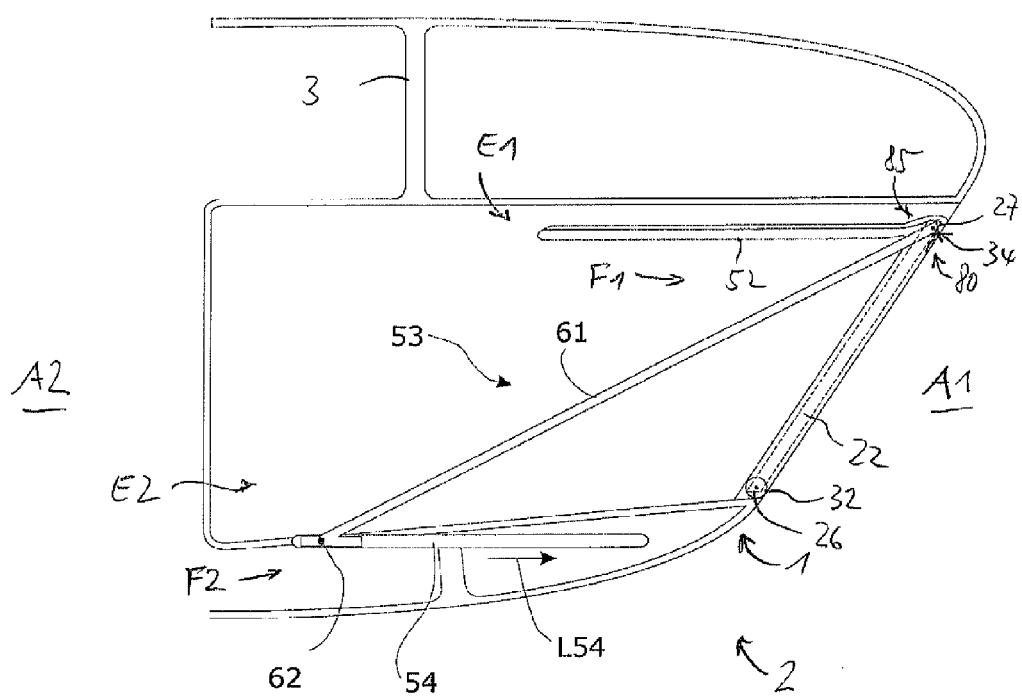
FIG. 17 a further embodiment of the storage compartment device in the position of the cover plate of FIG. 13.

In FIG. 17 an embodiment is illustrated, which differs in particular in the configuration of the first guide device F1 from the embodiments illustrated in FIGS. 11 to 16. In the embodiment according to FIG. 17, no upper guide 52 is provided, and the operating part 53 is configured differently accordingly. The operating part 53 is formed here from an operating lever 61 and a guide part 62 guided in the guide 54, wherein the guide part 62 is fastened securely, therefore also in a rotation-proof manner, on the operating lever 61 and is configured such that it is only displaceable along the path-dependent longitudinal direction L54 of the guideway of the guide 54 in the latter, i.e. is not rotatable with respect to the latter at least about a rotation axis transversely to the longitudinal direction L54. Provision can be made here that the guide part 62 is rotatable about the longitudinal direction L54. Alternatively to this, the guide part 62 can cooperate in its cross-section in a form-fitting manner with the cross-section of the guideway of the guide 54, so that the guide part 62 is not rotatable about the longitudinal direction L54.

The guideway of the guide 54 does not have to be arranged in the lower region of 1, as in the embodiment illustrated in FIG. 17. By corresponding configuration of the first guide device F1, in particular of the operating lever 61, of the guide part 62 and of the relative arrangement of the operating lever 61 and of the guide part 62 with respect to one another, the guideway of the guide 54 in the embodiment of FIG. 17 can also be arranged in the upper region of the storage compartment device 2.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A device (1) for selectively covering and uncovering an opening region (19) of a storage compartment (10) with a cover plate (22), the device (1) comprising:
   a first guide device (F1) adapted to couple an upper region (B1) of the cover plate (22) with the storage compartment (10); and
   a second guide device (F2) adapted to couple a lower region (B2) of the cover plate (22) with the storage compartment (10),
   wherein the first and second guide devices (F1, F2) are configured for coordinated movement of the cover plate (22) between a closed position, in which the cover plate (22) has an inner surface (30) and covers the opening region (19), and an opened position, in which the opening region (19) is at least partially exposed and the inner surface (30) of the cover plate (22) forms a storage surface (30'), and
   wherein one or both of the guide devices (F1, F2) includes a guide (40, 42, 58) configured to guide the respective upper or lower region (B1, B2) of the cover plate (22) during movement between the opened and closed positions, or between the opened position and a stowage position, in which the cover plate (22) is at least partially retracted into the storage compartment (10) and the opening region (19) is at least partially exposed.

2. The device (1) of claim 1, wherein the first guide device (F1) comprises a guideway (70, 52, 54) on the storage compartment (10) and a guide strip or guide lever (46, 53) pivotably coupled with the cover plate (22) at the upper region (B1) of the cover plate (22), the guideway (70, 52) being configured to receive the guide strip or guide lever (46, 53), and wherein the second guide device (F2) comprises a guide (40) configured to receive a guide part (32) coupled with the cover plate (22) at the lower region (B2) of the cover plate (22).

3. The device (1) of claim 2, wherein the storage compartment (10) extends in a longitudinal direction (L1) from the opening region (19) at a front side (A1) of the storage compartment (10) to a back wall (20) of the storage compartment (10),
   the guide strip or guide lever (46, 53) extending in the longitudinal direction (L1) from a first end (35), at which the cover plate (22) is coupled for rotation about an axis (34) during movement between the opened and closed positions, to a second end (37) that moves along the guideway (70, 52, 54),
   the guide (40) extending in a direction transverse to the guideway (70, 52, 54) and guiding the guide part (32) between the closed and opened positions, the storage surface (30') extending in the longitudinal direction (L1) when the cover plate (22) is in the opened position.

4. The device (1) of claim 2, wherein the storage compartment (10) extends in a longitudinal direction (L1) from the opening region (19) at a front side (A1) of the storage compartment (10) to a back wall (20) of the storage compartment (10),
   the first guide device (F1) comprising two guide strips or guide levers (46, 53) and two corresponding guideways (70, 52, 54) on the storage compartment (10), each strip or lever (46, 53) extending in the longitudinal direction (L1) from a respective first end (35), at which the cover plate (22) is coupled for rotation about an axis (34) during movement between the opened and closed positions, to a respective second end (37) that moves along the corresponding guideway (70, 52, 54),
   the second guide device (F2) comprising two guides (40) each extending in a direction transverse to the guideways (70, 52, 54) at the opening region (19) of the storage compartment (10) and guiding guide parts (32) coupled with the cover plate (22) at the lower region (B2) of the cover plate (22) between the closed and opened positions, the storage surface (30') extending in the longitudinal direction (L1) when the cover plate (22) is in the opened position.

5. The device (1) of claim 3, wherein the first guide device (F1) comprises the guide strip (46), the corresponding guideway (70) being arranged on an upper cover wall (14) of the storage compartment (10).

6. The device (1) of claim 5, wherein the guide strip (46) is located at an end (79) of the transverse guide (40), the guide strip (46) having a passage opening (44) configured to accommodate passage of the guide part (32) between the guide (40) and the guide strip (46) through the passage opening (44) during movement of the cover plate (22) between the closed and opened positions.

7. The device (1) of claim 5, wherein the guide strip (46) includes a detent depression (48) that receives the guide part (32) in the opened position such that the storage surface (30') can be maintained in the opened position and such that the guide part (32) can move with the guide strip (46) during movement of the cover plate (22) between the opened and stowage positions.

8. The device (1) of claim 7, further comprising a spring element (49) arranged to press the guide part (32) into the detent depression (48).

9. The device (1) of claim 3, wherein the first guide device (F1) comprises the guide lever (53), and the second end (37)

of the guide lever (53) moves in the longitudinal direction (L1) along parallel guideways (52, 54).

10. The device (1) of claim 9, further comprising an additional guide (58) extending in the longitudinal direction (L1) and located on the storage compartment (10), wherein the additional guide (58) is connected to an end (79) of the transverse guide (40) via an opening (45) that accommodates movement of the guide part (32) between the transverse guide (40) and the additional guide (58) through the opening (45).

11. The device (1) of claim 9, wherein the guide lever (53) comprises:
    a first lever arm (531) extending transversely to the longitudinal direction (L1) and having an end (56) guided along one of the parallel guideways (54); and
    a second lever arm (532) extending from the end (56) of the first lever arm (531) to the first end (35) of the guide lever (53).

\* \* \* \* \*